US006457041B1

(12) United States Patent
Hutchison

(10) Patent No.: US 6,457,041 B1
(45) Date of Patent: Sep. 24, 2002

(54) CLIENT-SERVER TRANSACTION DATA PROCESSING SYSTEM WITH OPTIMUM SELECTION OF LAST AGENT

(75) Inventor: Gordon Douglas Hutchison, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,794

(22) Filed: Jun. 25, 1999

(30) Foreign Application Priority Data

Feb. 19, 1999 (GB) .............................................. 9903717

(51) Int. Cl.$^7$ ............................................. G06F 15/16
(52) U.S. Cl. ....................... 709/203; 709/101; 709/200; 709/201; 709/217; 709/219; 709/227; 709/313; 709/315; 707/1; 707/2; 707/10; 707/100; 707/103 R
(58) Field of Search ................................. 709/203, 200, 709/201, 101, 217, 219, 313, 315, 227; 707/1, 2, 10, 100, 103 R

(56) References Cited

U.S. PATENT DOCUMENTS

| 4,949,254 A | * | 8/1990 | Shorter ........................ 709/106 |
| 5,212,788 A | * | 5/1993 | Lomet et al. ................ 707/201 |
| 5,261,089 A | * | 11/1993 | Coleman et al. ................ 707/8 |
| 5,432,926 A | * | 7/1995 | Citron et al. .................... 714/4 |
| 5,440,744 A | * | 8/1995 | Jacbson et al. ............. 709/203 |
| 5,734,897 A | * | 3/1998 | Banks ......................... 707/202 |
| 5,754,772 A | * | 5/1998 | Leaf ............................ 709/203 |
| 5,862,326 A | * | 1/1999 | Bapat .......................... 709/203 |
| 5,884,327 A | * | 3/1999 | Cotner et al. ............... 707/202 |
| 5,920,863 A | * | 7/1999 | McKeehan et al. ........... 707/10 |
| 6,185,598 B1 | * | 2/2001 | Farber et al. ................ 709/200 |
| 6,205,464 B1 | * | 3/2001 | Cobb et al. .................. 709/101 |
| 6,243,739 B1 | * | 6/2001 | Schwartz et al. ........... 709/206 |

FOREIGN PATENT DOCUMENTS

| EP | 0677943 A2 | * | 10/1995 | |
| GB | 2 301 909 | | 12/1996 | |
| GB | 2 327 780 | | 2/1999 | |
| GB | 2327780 | * | 2/1999 | ........... H04L/12/26 |

OTHER PUBLICATIONS

IBMTDB, title : Recovery Management in Transaction Processing Systems; vol. 39, issue 4, pp. 27–30.*
IBMTDB, title : Optimizing Use of Local Coordinates in Distributed Application; vol. 40, issue 2, pp. 199–204.*
IBM Technical Disclosure Bulletin, Dec. 1991, v34, n7B, pp. 334–338, "Combining presumed abort two phase commit protocols with SNA's last agent optimization".

* cited by examiner

*Primary Examiner*—Ayaz Sheikh
*Assistant Examiner*—Frantz B. Jean
(74) *Attorney, Agent, or Firm*—A. Bruce Clay

(57) ABSTRACT

A first server computing apparatus receives a reply from a second server apparatus, the reply includes an indication of the total amount of time that the second apparatus has taken to generate the reply. The first apparatus determines the total amount of time that has elapsed between the sending of the reply and the receipt of the reply. The first apparatus also determines the total amount of transit time for the request to travel from the first apparatus to the second apparatus and the reply to travel from the second apparatus to the first apparatus. The first apparatus selects one of a plurality of apparatuses as a last agent for use in a last agent optimization operation during completion of the distributed transaction based on the determinations.

11 Claims, 5 Drawing Sheets

CLIENT-SERVER TRANSACTION DATA PROCESSING SYSTEM WITH OPTIMUM SELECTION OF LAST AGENT

The present invention is related to the following commonly-assigned U.S. Patents, both of which were filed on Jun. 25, 1999 and which are hereby incorporated herein by reference: Ser. No. 09/344,799), entitled "Client/Server Computing for Transaction Processing with Superior Coordinator Optimization" and Ser. No. 09/339,378), entitled "Client/Server Transaction Data Processing System with Automatic Distributed Coordinator Set Up Into a Linear Chain for use of Linear Commit Optimization".

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA-the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

An application running on a client process begins a transaction which may involve calling a plurality of different servers, each of which will initiate a server process to make changes to its local data according to the instructions contained in the transaction. The transaction finishes by either committing the transaction (and thus all servers finalize the changes to their local data) or aborting the transaction (and thus all servers "rollback" or ignore the changes to their local data made during the transaction). To communicate with the servers during the transaction (e.g., instructing them to either commit or abort their part in the transaction) one of the processes involved must maintain state data for the transaction. According to the OTS standard, this involves the process setting up a series of objects, one of which is a coordinator object which coordinates the transaction with respect to the various servers.

The main purpose of this coordinator object is to keep track of which server objects are involved in the transaction, so that when the transaction is finished, each server object involved in the transaction can be told to commit the changes made locally to the local database associated with that server object, in a single unified effort. This ensures that no server object makes a data change final without the other server objects which are also involved in the same transaction doing so. Thus, each server object which is to join a transaction must first register with the coordinator object so that the coordinator object will know of the server object's existence, its wish to join the transaction, and where to find the server object (e.g., which server machine the server object resides on) when it comes time to complete the transaction (where the coordinator object instructs all server objects to make the changes to their respective local data final).

A server object responsible for updating data (referred to hereinbelow as a resource object) gets involved in a transaction when another server object (or the original client object which started the transaction) sends a request to the resource object for the resource object to do some work. This latter request carries some information, called the transaction context, to inform the resource object that the request is part of a transaction. With CORBA version 2, the transaction context is built by the local CosTransactions::Coordinator object get_txcontext method. Once a resource object finds out that it is to be involved in a transaction, it then makes a registration request with the coordinator object.

When the resource object is located in a different operating system process from the coordinator object, it has been found to be useful to use a subordinate coordinator object (222 in FIG. 2) located in the same operating system process as the resource object (223 or 224). The main coordinator object is then called the "superior coordinator object" 211. During registration of a resource object 223 to the transaction, the subordinate coordinator 222 is set up locally inside the server machine 22 which houses the resource object 223 and the resource object 223 communicates directly with this subordinate coordinator object 222 when it makes a registration request. (It should be noted that while the term "server machine" is used here, the term "server process" could also be used, to thus indicate that the distributed server objects could, in fact, be located on the same server machine but on different operating system processes running on the server machine, and hereinafter the term "server" will be used to refer to both terms.) The subordinate coordinator 222, in turn, registers itself with the superior coordinator object 211 (which is located in another process possibly on another server machine as if it were a resource object).

The subordinate coordinator object 222 thus provides a representation of the existence of the transaction within the server housing the resource object. Instead of communicating directly with the superior coordinator object 211, the resource objects 223 and 224 first communicate with their local subordinate coordinator object 222 which in turn communicates with the superior coordinator object. This greatly reduces the number of cross-operating-system-process calls.

Oftentimes, a transaction will involve a number of different processes, each potentially running on a different server machine. For example, in server process 21 (which includes superior coordinator 211) may call three different processes to take part in a distributed transaction, and thus each of such processes would result in the creation of a subordinate coordinator to locally coordinate the transaction in that process. At the end of the transaction, the superior coordinator would use the traditional two-phase commit protocol to make sure that each of the three processes makes its changes final in a unitary "all or nothing" fashion (i.e., either they all commit their changes or they all roll back their changes). The two phase commit protocol traditionally involves sending a prepare call to each of the three subordinate coordinators and then sending a commit call to each of the three subordinate coordinators, assuming that they have all voted to commit in response to the prepare call. This would, thus, involve the superior coordinator 211 sending six cross-process calls.

A well known optimization of the two phase commit protocol, which is often used to reduce the number of total cross process calls in the two phase commit, is known as the "last agent optimization" (e.g., see *Transaction Processing: Processes and Techniques* by Gray and Reuter, Morgan Kaufman Publishers, September 1992, Section 12.5.3). To summarize this optimization, if a transaction root coordinator (e.g., superior coordinator 211) has N resources (e.g., representing 3 subordinate coordinators) involved in a transaction it will prepare (i.e., send prepare flows to) N−1 of them. At this point if all the resources vote commit (the usual case) the transaction outcome depends only on the last resource's prepare vote. We can therefore combine the prepare and commit flows to the last resource, this optimized final flow is catered for in the CORBA CosTransactions specification by the resource::commit_one_phase method. In this discussion, subordinate coordinators, their resources, and other resources can be treated the same way and are generically termed the 'agents' involved. With the last agent optimization, the message flows are halved between the coordinator and the last agent over the simple case for two phase commit.

In an implementation of the standard CosTransactions service of CORBA's OTS, a root coordinator of a distributed transaction will typically have a number of agents registered in the transaction. Some may represent local application or database resources, some may represent other subordinate coordinators ('resources') in other processes of the same machine and some may represent agents in remote machines. Any one of these resources is a valid candidate to be prepared last and in the CosTransaction service, (as used in IBM's Component Broker (CB) software product, for example) there is no differentiation between such classes of resource.

However, the message flows to these three categories of resource are likely to take widely varying times to flow. For example, one of the processes could be connected to the superior coordinator 211's process via a satellite link, while another of the processes could be located on a server machine that is very close to the superior coordinator 211's process. The amount of time the commit_one_phase operation (i.e., last agent optimization) will actually save can thus vary widely—for a local resource this savings will be minimal but for a remote resource on a distant machine the saving in message traffic and commit completion time is much more valuable.

In the context of client/server transaction processing, there has heretofore not been known a way to optimize the selection of the last agent for use in the last agent optimization, and this deficiency in the prior art has been the stimulus which has led the present inventor to the present invention.

DISCLOSURE OF THE INVENTION

According to a first aspect, the present invention provides a first server computing apparatus for use in a client/server transaction processing system, the first apparatus having: means for sending a request to a second server data processing apparatus that is involved in processing a distributed transaction; means for receiving a reply to the request from the second server data processing apparatus, the reply including an indication of the total amount of time that the second server data processing apparatus has taken to process the request and generate the reply; a first means for determining the total amount of time that has elapsed between the sending of the request by the first apparatus and the receipt of the reply by the first apparatus; a second means for determining the total amount of transit time for the request to travel from the first apparatus to the second apparatus and the reply to travel from the second apparatus to the first apparatus, where the second means uses the output of the first means and the indication provided in the reply to determine the total amount of transit time; a means for keeping a record based on the results of the second means over a plurality of server data processing apparatuses that are involved in the transaction; a selection means for selecting one of the apparatuses as a last agent for use in a last agent optimization operation during completion of the distributed transaction, based on the results of the means for keeping.

Preferably, the indication is provided in each reply as part of a transaction propagation context. Further preferably, the indication is provided in each reply in a Common Object Request Broker Object Transaction Service <any> field of the transaction propagation context.

According to a second aspect, the invention provides a method of operating a first server computing apparatus for use in a client/server transaction processing system, the method comprising steps of: (a) sending a request to a second server data processing apparatus that is involved in processing a distributed transaction; (b) receiving a reply to the request from the second server data processing apparatus, the reply including an indication of the total amount of time that the second server data processing apparatus has taken to process the request and generate the reply; (c) determining the total amount of time that has elapsed between the sending of the request by the first apparatus and the receipt of the reply by the first apparatus; (d) determining the total amount of transit time for the request to travel from the first apparatus to the second apparatus and the reply to travel from the second apparatus to the first apparatus, wherein the step (d) uses the output of the step (c) and the indication provided in the reply to determine the total amount of transit time; (e) keeping a record based on the results of step (d) over a plurality of server data processing apparatuses that are involved in the transaction; (f) selecting one of the apparatuses as a last agent for use in a last agent optimization operation during completion of the distributed transaction, based on the results of step (e).

According to a third aspect, the invention provides a program storage device readable by a machine, tangibly embodying a program of instructions executable by the machine to perform the method steps of the second aspect.

Thus, the invention enables the calculation of the total time taken by the flow of a request from a first server process to another server process and for the corresponding reply to flow back to the first server process, without including the time taken for the receiving server process to process the request and generate the reply. As resources are registered with the coordinator in the first server process, the coordinator keeps a record of which resource had the longest round trip message delivery time and ensures that if it is in a situation to use the commit_one_phase method (ie it is the root coordinator originally or has received commit_one_hase itself), this method is flowed to a resource where the maximum time will be saved.

The present invention thus ensures the maximum benefit out of the well known concept of last agent optimization. As many modern distributed systems such as those based on CORBA's OTS are 'location transparent' in the application layers local and remote resources are often treated homogeneously. However, using commit_one_phase to a local resource saves relatively little time in a transaction that also has a remote participant and will thus be making remote message flows as part of completion. This optimization is inexpensive to implement, in terms of CPU loading and message data volume.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

In using the last agent optimization at the end of a transaction that is distributed over a plurality of server processes, the most benefit can be obtained from the optimization if the agent in a server process that is chosen as the last agent is the one that it takes the longest time to send data to and receive data from. Thus, the task at hand is to determine, with respect to a superior coordinator, which server process that is involved in the distributed transaction, takes the longest time for the superior coordinator to send a message to and receive a message from an agent in such server process. Obviously, it would be a simple matter for the server process having the superior coordinator to calculate the total time it takes between the sending of a message and the receipt of a reply from each server process. However, this is not valuable for the purposes of the present invention as it would include method execution time at the destination node.

Figure 1:
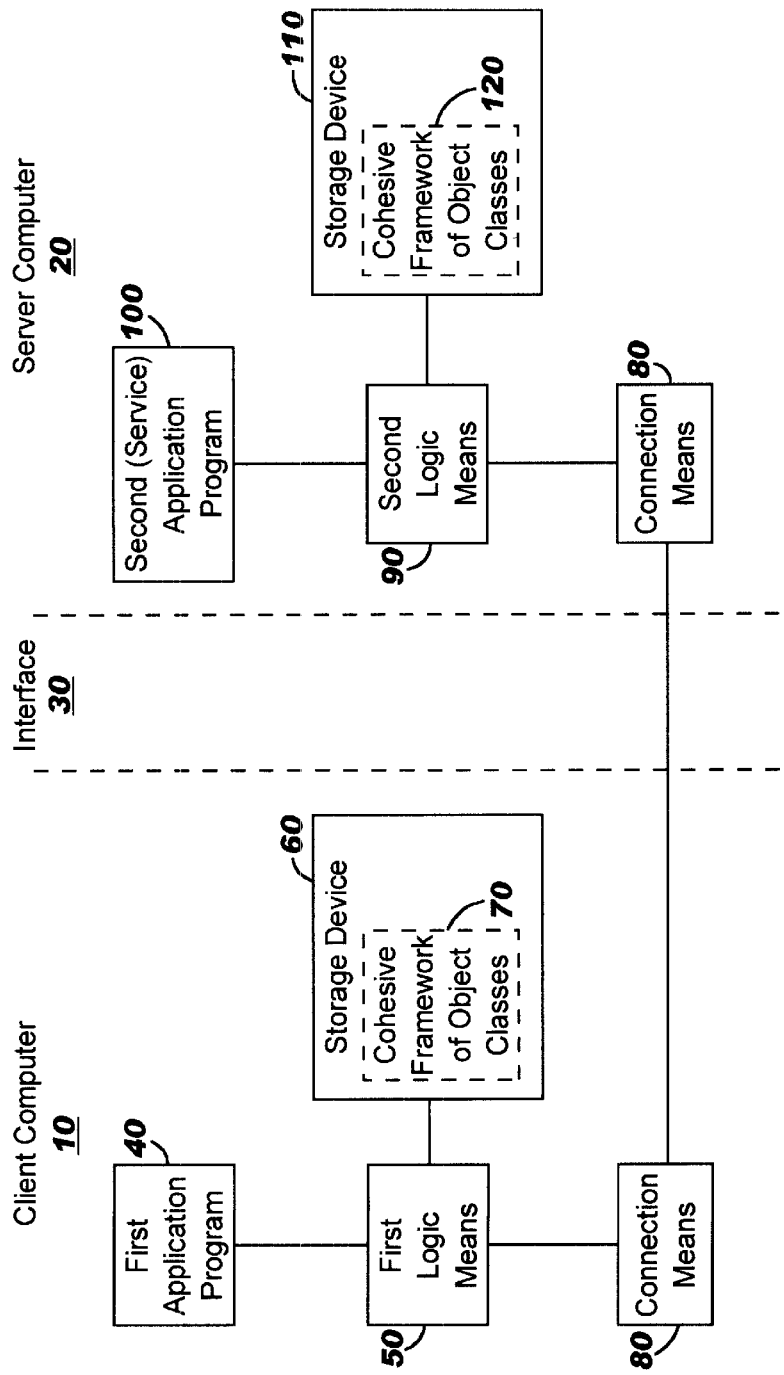
FIG. 1 is a block diagram of a well-known heterogeneous client/server architecture using object technology, in the context of which preferred embodiments of the present invention can be applied.
Figure 2:
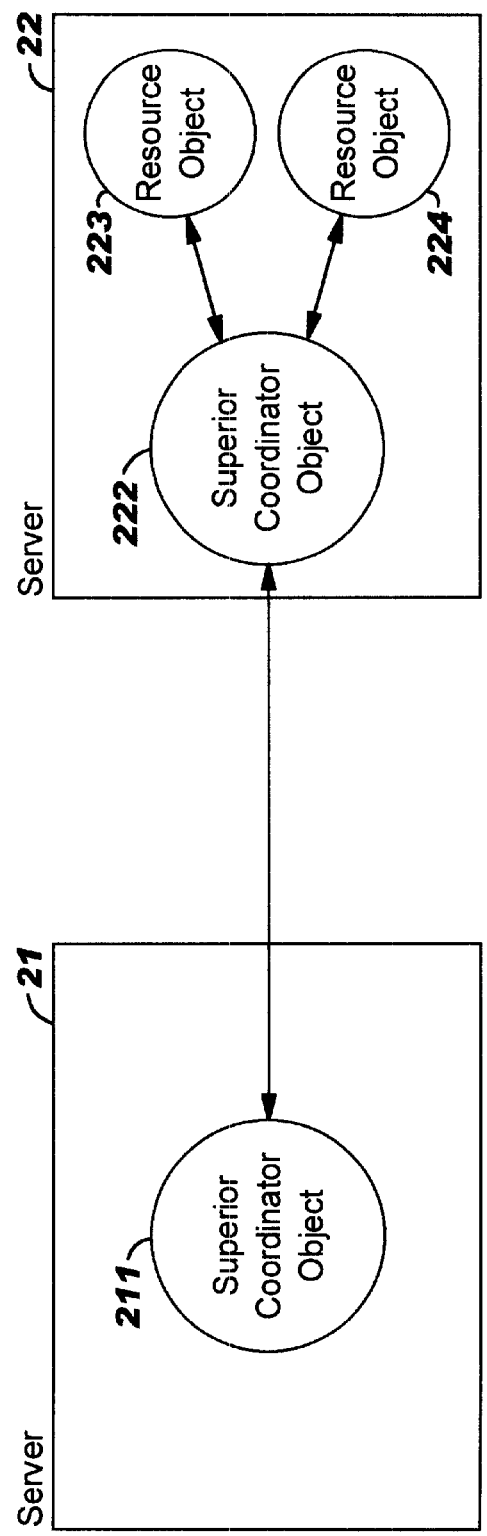
FIG. 2 is a block diagram showing the various objects instantiated within two co-transactional servers according to a conventional system.
Figure 3:
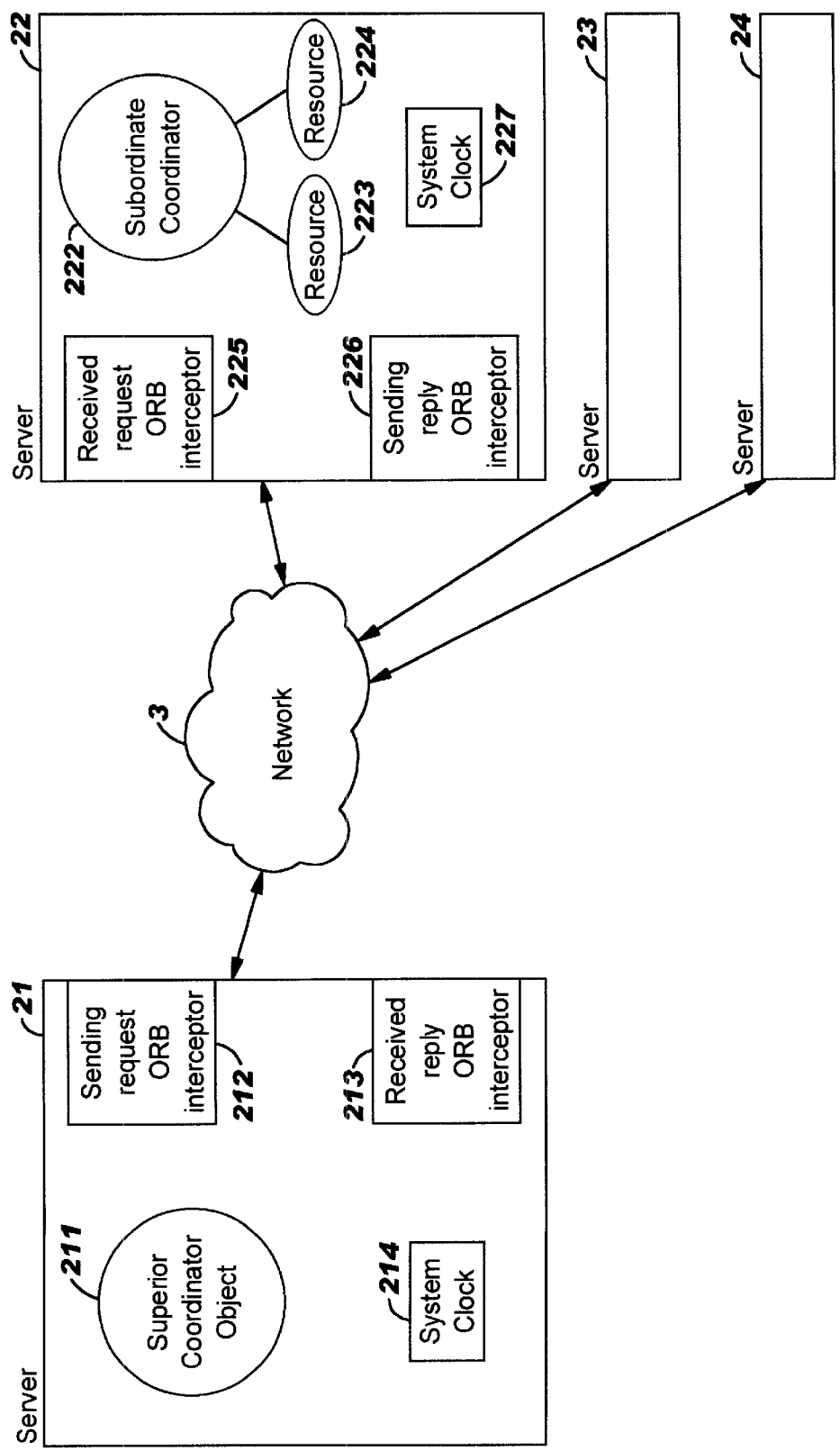
FIG. 3 is a block diagram showing software components according to a preferred embodiment of the present invention.

The preferred embodiment of the present invention, as illustrated in FIG. 3, makes use of the well known CosTSPortability::Sender and Receiver ORB interceptors. The ORB interceptors are called sending_request 212, received_request 225, sending_reply 226 and received_reply 213 and are executed in that order. The first and last interceptors (212 and 213) reside in the sender process (server 21) and the middle two interceptors (225 and 226) reside in the recipient server process (server 22) of the message. While only one server 22 on the right hand side of FIG. 3 has been illustrated in detail for ease of illustration, other servers 23 and 24, which are also called into the transaction, are similarly constructed.

The server processes each have access to a system clock (214 for server 21 and 227 for server 22) that, when accessed, gives back the current time in milliseconds. We will call this access method 'clock( )' and its output (as a large integer) 'time'.

Figure 4:
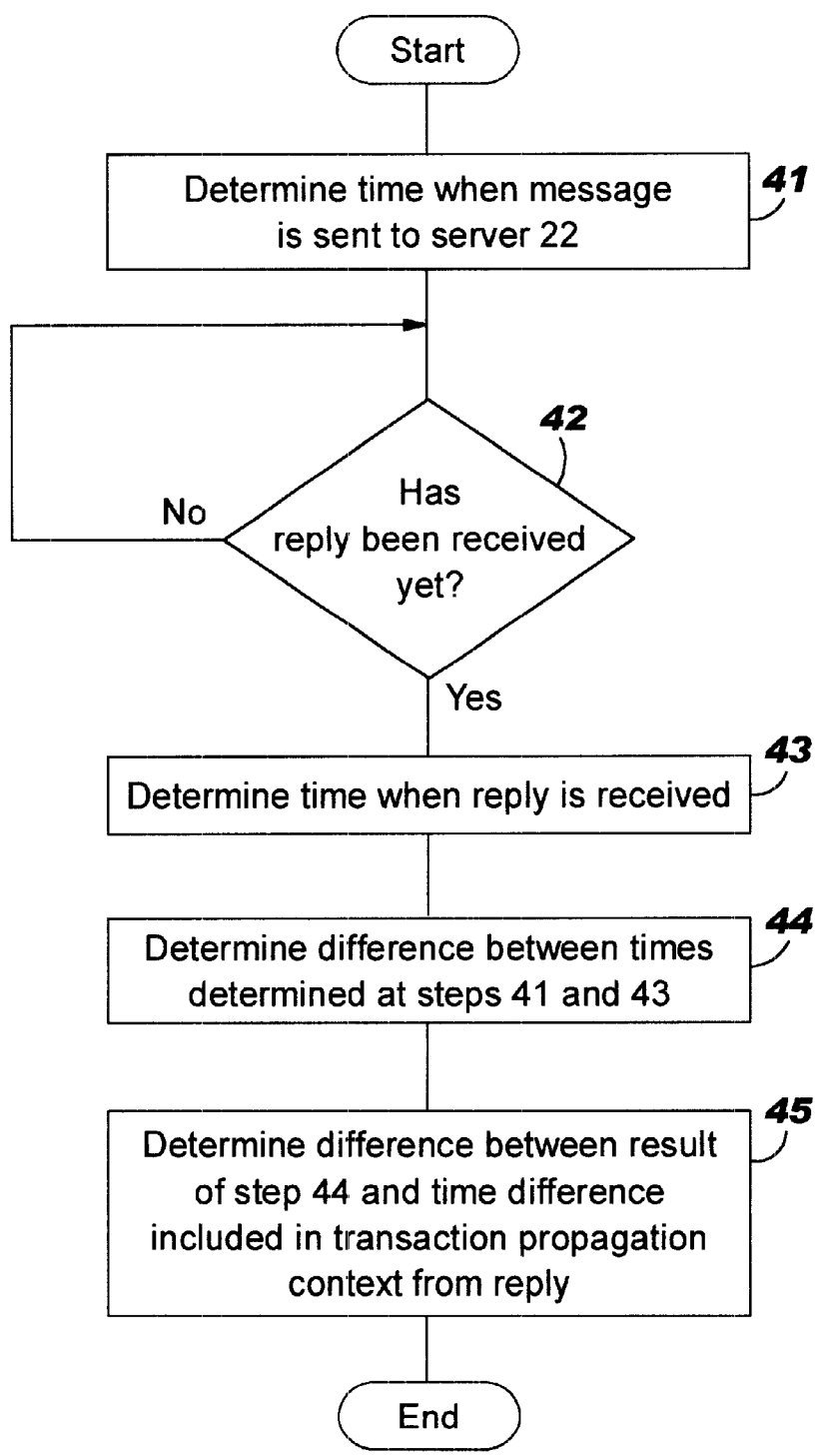
FIG. 4 is a flowchart showing the steps carried out by a main server process according to a preferred embodiment of the present invention.

When the sending_request interceptor 212 sends a message out to a remote node (e.g., server 22) over a network 3, the 'time' the message is sent is determined (step 41 of FIG. 4, which shows the steps carried out by server 21) by accessing the system clock 214, and the time value is then stored in local storage. In the preferred embodiment, this message is a call to the server 22 which results in the server 22 sending a registration request to its superior coordinator, requesting that a resource (e.g., 223) located on the server 22 be registered in the transaction. The server 21 then waits (step 42) until a reply is received. Of course, the server 21 can do other jobs while waiting, but a decision box with a loop best illustrates that, for the purposes of the present invention, the server 21 cannot proceed until it receives a reply from the server 22.

Figure 5:
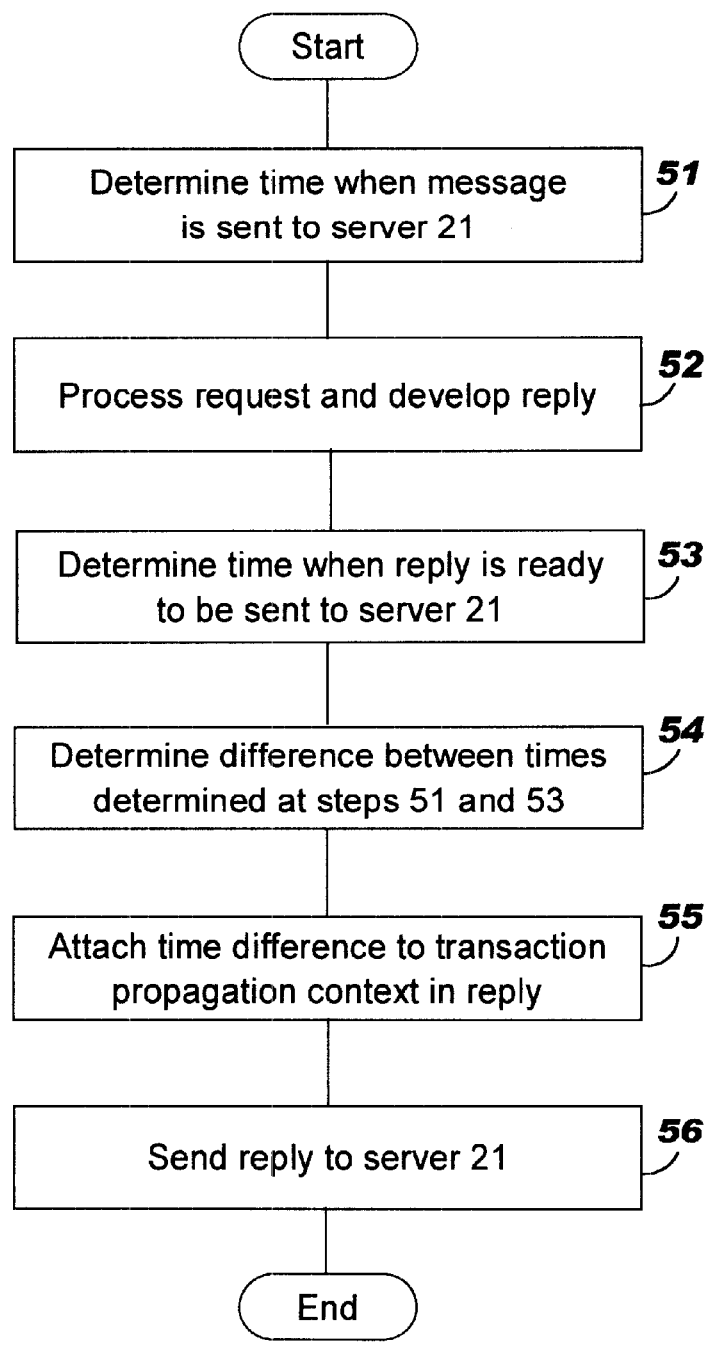
FIG. 5 is a flowchart showing the steps carried out by a secondary server process according to a preferred embodiment of the present invention.

On the remote server 22, the received_request interceptor 225 determines (step 51 of FIG. 5 which shows the steps carried out by the server 22) the local 'time' the request was received from the ORB over the network 3 (by accessing its system clock 227) and stores this value. The server 22 then proceeds to process the request and develop a reply (step 52). When the corresponding sending_reply interceptor 226 is executed for the purpose of sending the reply over the network 3 to the server 21, the local time is again taken (step 53) by accessing the system clock 227 and the difference between the two times (the time when the message was received over the network 3 and the time when the reply is being sent back over the network 3) is calculated (step 54). This is the time (in milliseconds) that the server 22 has spent processing the method request and generating the reply. This time interval (an integer) is attached (step 55) to the transaction propagation context that is flowed back (step 56) over the network 3 to the sender (server 21). There is a CORBA field called "<any>" in the transaction propagation context that is used to store this time interval, according to the preferred embodiment. The extra message data volume and/or CPU resources necessary to be expended to accommodate this is very small.

In the sender server system 21 (that is now receiving the reply) the received_reply interceptor 213 of the transaction service is run. The received_reply method checks the local system clock 214, using the method 'clock( )' to determine (step 43) the time when the reply is received, and then calculates (step 44) the round trip time of the message in milliseconds with a simple subtraction (of the time when the received reply ORB interceptor 213 received the reply from server 22 minus the time when the sending request ORB interceptor 212 sent the message to server 22. The server 21 pulls the "received_request to sending_reply time" interval out of the propagation context and performs an integer subtraction to obtain (step 45) the total time spent in round trip message transit of the request/reply.

The message transit time for this request/reply with respect to this particular server 22 is held in memory just until the processing for the application's transactional work is completed. If a resource has been registered at the destination of this request, the coordinator will examine the message transit time for the message. If the transit time for this particular server 22 is the longest as compared to all of the other servers that have already registered resources in the transaction, then server 22 is remembered as the new candidate for last agent optimization.

The time flow diagram below gives an example, with numerical values, of the processing described above, with System A being the sender, analogous to server 21, and System B being the receiver, analogous to server 22.

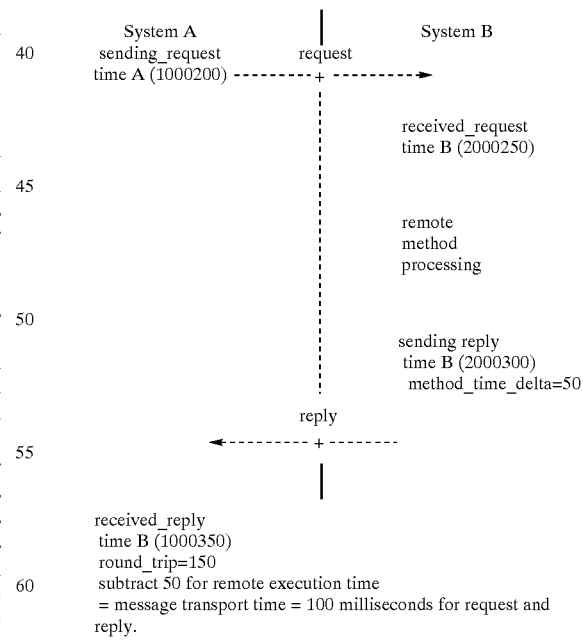

The idea above discusses a mechanism used between two individual nodes that are taking part in the transaction. An improvement on this can be made which take into account the downstream message costs of any nodes chained off of the nodes being considered and thus 'downstream' in the transaction chain. (As only a node that is itself passed the one-phase-commit operation can use this optimization on subsequent downstream agents registered with it.)

For example if we are considering two candidate nodes for last agent selection both candidate nodes may be 'equidistant' with respect to the node that is doing the last-agent selection but each of those nodes may have varying downstream transaction chains and in this case it would be advantageous to send the last agent optimization (commit-one-phase) to the node that had the 'longest' downstream attachment of participants even though when the two nodes are considered on their own (if the chain is analyzed one node deep) they appear evenly matched in terms of message transit cost. The mechanism described above stacks easily and simply with each chain being costed in an aggregated fashion to include downstream nodes but with the processing being similar at each node.

The mechanism functions with each node calculating its "method-time-delta" (the processing time required to process the request and generate a reply thereto) as above but also factoring in the message cost of the most costly agent registered with it (done in exactly the same way as above). This is achieved by each coordinator (node) calculating it's "method-time-delta" and then subtracting from this calculation it's calculated message cost metric for it's own selected candidate for the last-agent-optimization (ie it's most costly down stream branch). This can be seen to give the correct result as the superior node will subsequently SUBTRACT the "method-time-delta" from it's own method flow costing calculation. In other words, in order to ADD on the cost metric for this down stream node's last-agent chain's message flow to the upstream calculation, the "method-delta-time" is reduced by the same amount.

If a node has a very costly downstream chain, the "method-time-delta" passed back may actually become negative. When the superior calculates the message time cost it will be able to ADD on additional time to the metric (by the subtraction of a negative number producing an addition) to account for the nested downstream message flow costs that could be saved if the commit-one-phase was flowed down the particular branch being considered.

An example of this nested operation will now be provided. Node A has to choose node B or C as the last agent. Both nodes B and C run exactly the same systems and have the same message cost from node A. If the algorithm only considers internode message costs to the depth of one node A may miss the optimization possible when choosing node C over node B as the last agent (This is better as then node C can subsequently also use last-agent-optimization to node D as well but only if node C receives the optimized flow itself.)

Without the nested optimization, both B and C would return a method-time-delta of 50 (all time units are in milliseconds) and either could be selected. However with the improved, nested embodiment, node C currently has a candidate for last agent optimization and has calculated the message flow cost to node D as being 40 milliseconds. Instead of returning the simple 50 milliseconds method-time measurement it subtracts it's last-agent chains message flow cost of 40 and returns 10.

When node A is calculating the message costs of it's downstream agents if the flows to B and C took 100 milliseconds to return it would calculate the downstream chain costs of B and C as being

B (100−50)=50

C (100−(50−40=10 returned from C))=90

It would then correctly select C as the best last-agent candidate.

Some other field of the transaction propagation context, besides the <any> field could be used to carry the amount of processing time at the remote server process.

Still further, the invention is not limited to implementations of the CORBA OTS, other types of object-based distributed transactions are also contemplated by the invention. The transactions contemplated by the invention also need not be limited to object-oriented architectures, as these were only described in the context of a preferred embodiment with which the inventor happened to be working. The important feature of the invention of sending timing data via inter-system transactional requests can be applied to both object-oriented and non-object-oriented systems.

In the attached claims, the term "apparatus" can be either a machine or a process running on a machine.

I claim:

1. A first server computing apparatus for use in a client/server transaction processing system, the first apparatus comprising:
    means for sending a request to a second server data processing apparatus that is involved in processing a distributed transaction;
    means for receiving a reply to the request from the second server data processing apparatus, the reply including an indication of the total amount of time that the second server data processing apparatus has taken to process the request and generate the reply;
    first means for Determining the total amount of time that has elapsed between the sending of the request by the first apparatus and the receipt of the reply by the first apparatus;
    second means for determining the total amount of transit time for the request to travel from the first apparatus to the second apparatus and the reply to travel from the second apparatus to the first apparatus, wherein the second means uses the output of the first means and the indication provided in the reply to determine the total amount of transit time;
    means for keeping a record based on the results of said second means over a plurality of server data processing apparatuses that are involved in the transaction;
    selection means for selecting one of the apparatuses as a last agent for use in a last agent optimization operation during completion of the distributed transaction, based on the results of said means for keeping.

2. The apparatus of claim 1, wherein said indication is provided in each reply as part of a transaction propagation context.

3. The apparatus of claim 2, wherein said indication is provided in each reply in a Common Object Request Broker Object Transaction Service <any> field of the transaction propagation context.

4. The apparatus of claim 1, wherein the selection means selects an apparatus which has the longest transit time for use in the last agent optimization operation by referring to the means for keeping.

5. A method of operating a first object-oriented server computing apparatus for use in a client/server transaction processing system, the method comprising steps of:
    (a) sending a request to a second server data processing apparatus that is involved in processing a distributed transaction;
    (b) receiving a reply to the request from the second server data processing apparatus, the reply including an indication of the total amount of time that the second server data processing apparatus has taken to process the request and generate the reply;

(c) determining the total amount of time that has elapsed between the sending of the request by the first apparatus and the receipt of the reply by the first apparatus;

(d) determining the total amount of transit time for the request to travel from the first apparatus to the second apparatus and the reply to travel from the second apparatus to the first apparatus, wherein the step (d) uses the output of the step (c) and the indication provided in the reply to determine the total amount of transit time;

(e) keeping a record based on the results of step (d) over a plurality of server data processing apparatuses that are involved in the transaction;

(f) selecting one of the apparatuses as a last agent for use in a last agent optimization operation during completion of the distributed transaction, based on the results of step (e).

6. The method of claim 5, wherein said indication is provided in each reply as part of a transaction propagation context.

7. The method of claim 6, wherein said indication is provided in each reply in a Common Object Request Broker Object Transaction Service <any> field of the transaction propagation context.

8. A program storage device readable by a machine, tangibly embodying a program of instructions executable by the machine to perform the method steps of claim 5.

9. The program storage device of claim 8, wherein said indication is provided in each reply as part of a transaction propagation context.

10. The program storage device of claim 8, wherein said indication is provided in each reply in a Common Object Request Broker Object Transaction Service <any> field of the transaction propagation context.

11. A first server computing apparatus for use in a client/server transaction processing system, the first apparatus comprising:

means for sending a request to a second server data processing apparatus that is involved in processing a distributed transaction;

means for receiving a reply to the request from the second server data processing apparatus, the reply including an indication of the total amount of time that the second server data processing apparatus has taken to process the request and generate the reply;

first means for determining the total amount of time that has elapsed between the sending of the request by the first apparatus and the receipt of the reply by the first apparatus;

second means for determining the total amount of transit time for the request to travel from the first apparatus to the second apparatus and the reply to travel from the second apparatus to the first apparatus, wherein the second means uses the output of the first means and the indication provided in the reply to determine the total amount of transit time;

means for keeping a record based on the results of said second means over a plurality of server data processing apparatuses that are involved in the transaction; and selection means for selecting, from said plurality of apparatuses, one apparatus with a longest transit time based on results of said means for keeping, as a last agent for use in a last agent optimization operation during completion of the distributed transaction.

* * * * *